United States Patent [19]

Milberger

[11] 4,293,148

[45] Oct. 6, 1981

[54] PILE CONNECTOR

[75] Inventor: Lionel J. Milberger, Spring, Tex.

[73] Assignee: FMC Corporation, Chicago, Ill.

[21] Appl. No.: 123,158

[22] Filed: Feb. 20, 1980

[30] Foreign Application Priority Data

Feb. 22, 1979 [GB] United Kingdom ............... 06369/79

[51] Int. Cl.³ ............................................ F16L 37/14
[52] U.S. Cl. ....................................... 285/90; 285/305
[58] Field of Search ............... 285/276, 305, 321, 403, 285/90; 403/355, 356, 357

[56] References Cited

U.S. PATENT DOCUMENTS

| 408,835 | 8/1889 | Grafton | 285/305 |
|---|---|---|---|
| 3,092,962 | 6/1963 | Wood | 285/305 X |
| 3,181,897 | 5/1965 | Krayenbuhl | 285/305 X |
| 3,334,929 | 8/1967 | Wiltse | 285/305 |
| 3,606,402 | 9/1971 | Medney | 285/423 X |

FOREIGN PATENT DOCUMENTS 1310712 10/1962 France .................................. 285/305

Primary Examiner—Dave W. Arola
Attorney, Agent, or Firm—W. W. Ritt, Jr.; L. B. Guernsey

[57] ABSTRACT

A mechanical pipe connector which is especially suited for interconnecting sections of large tubular piling. The connector includes a tubular inner member having a wall with a first annular groove cut in the outside face thereof, and a tubular outer member having a wall with a second annular groove cut in the inside face of the wall. At least one hole extends from the second annular groove through the wall of the outer member to the outside thereof. The inner member fits into a passage in the outer member with the first and second annular grooves juxtaposed to form a common annular channel between the inner and outer members. A flexible locking tape is inserted through the hole in the outer member and into the annular channel to lock the inner and outer members securely together. The locking tape and the annular channel each have a polygon cross-sectional shape with the polygon having obtuse angles to minimize the stress concentration on the loading tape and on the walls of the annular channel.

10 Claims, 8 Drawing Figures

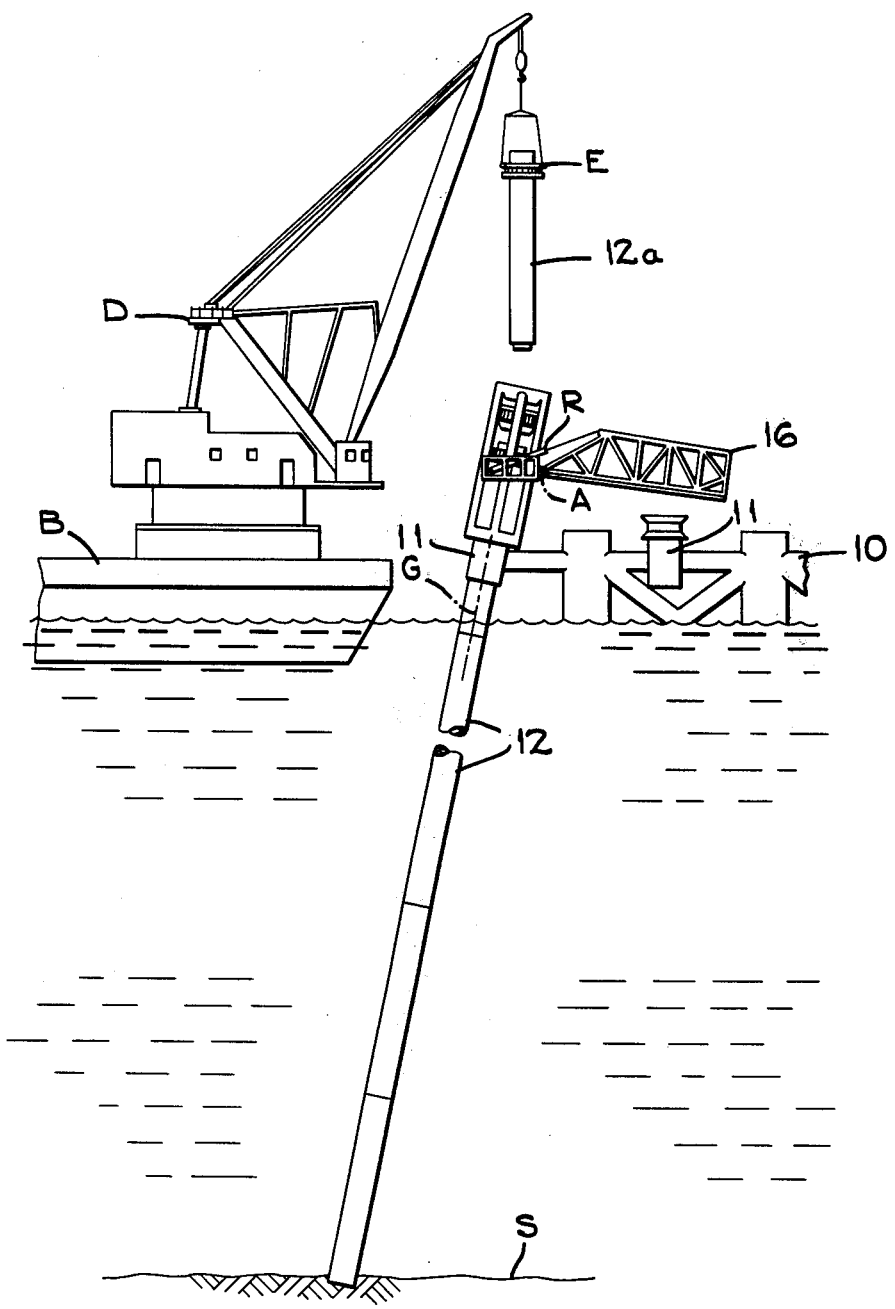
FIG_1

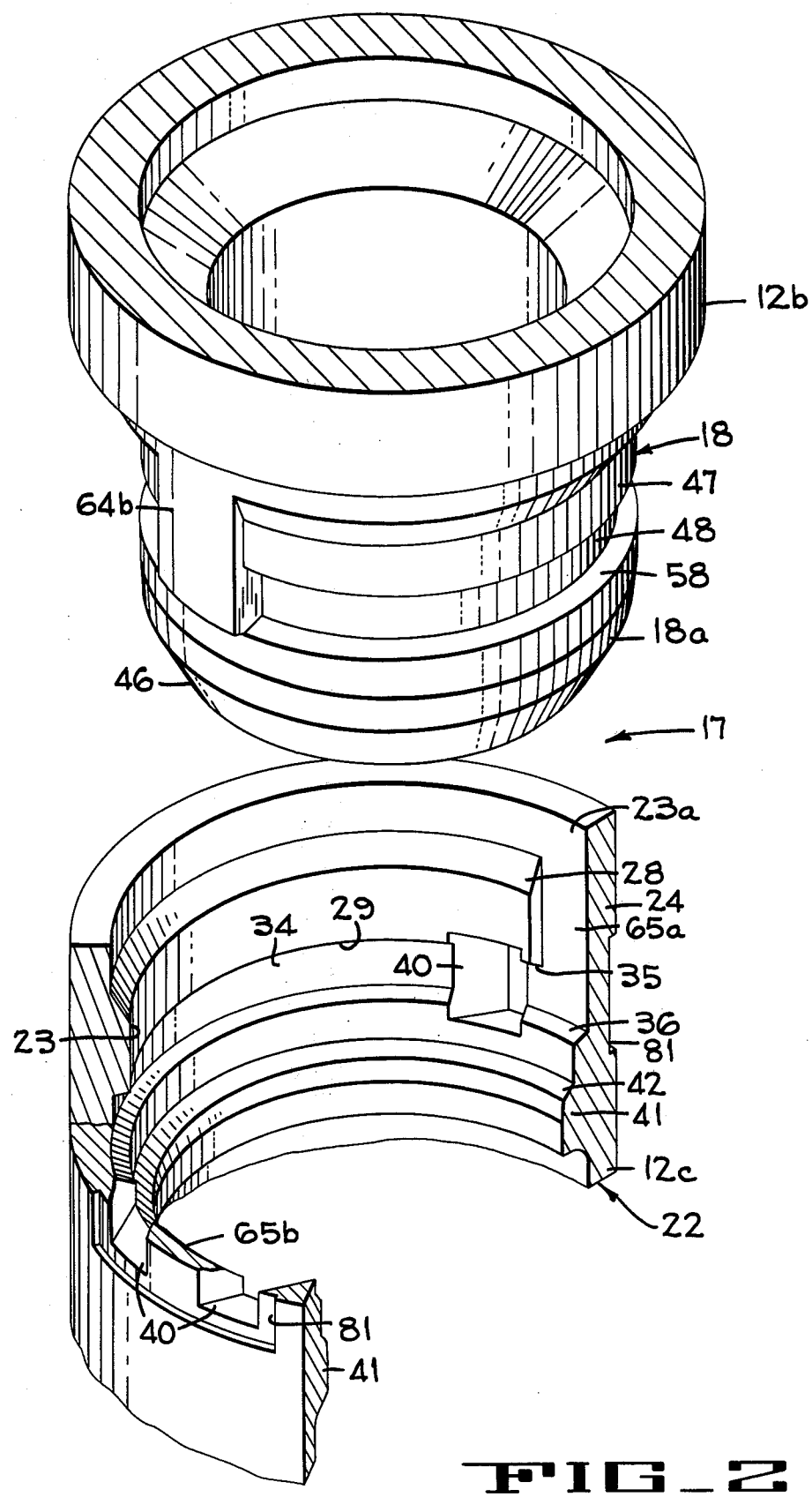
FIG_2

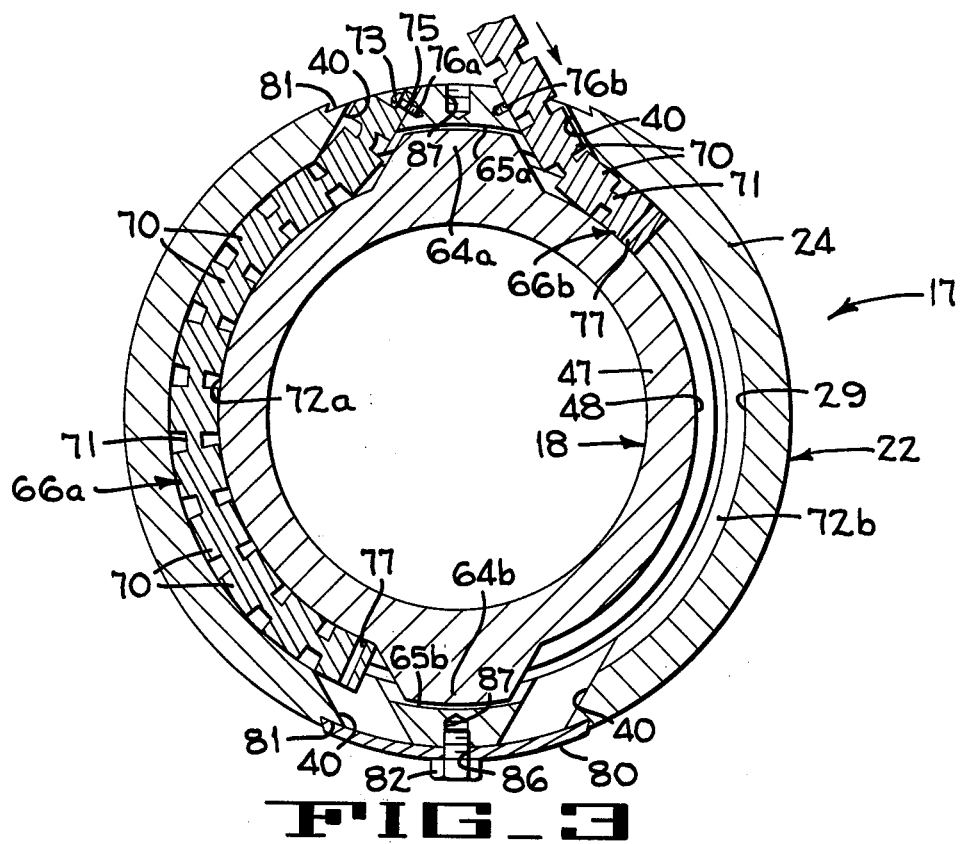
FIG_3
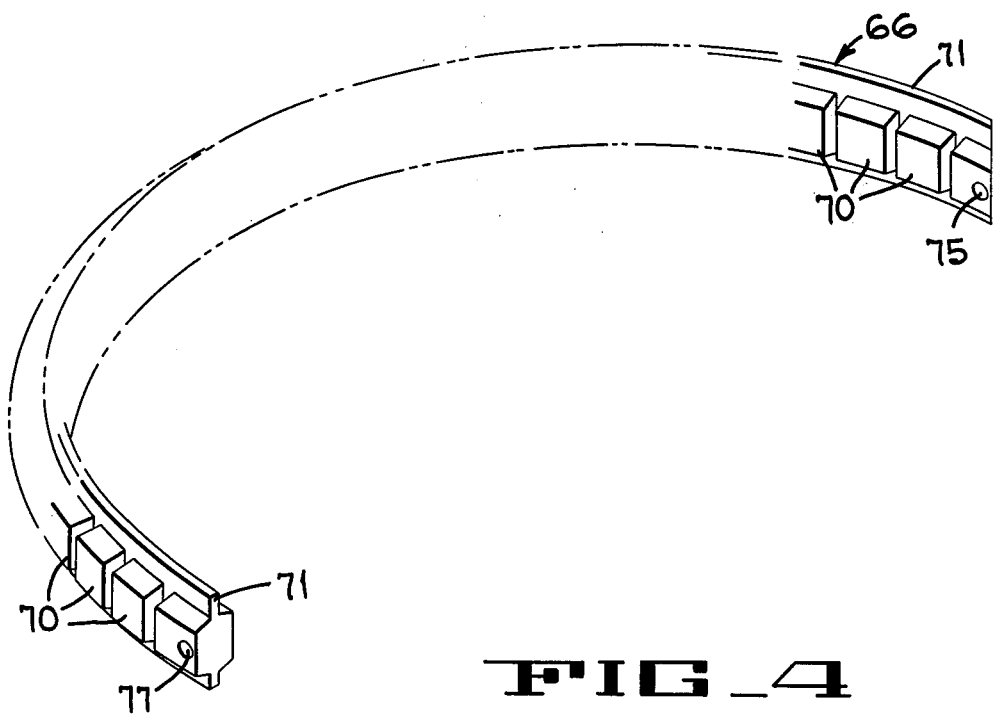
FIG_4

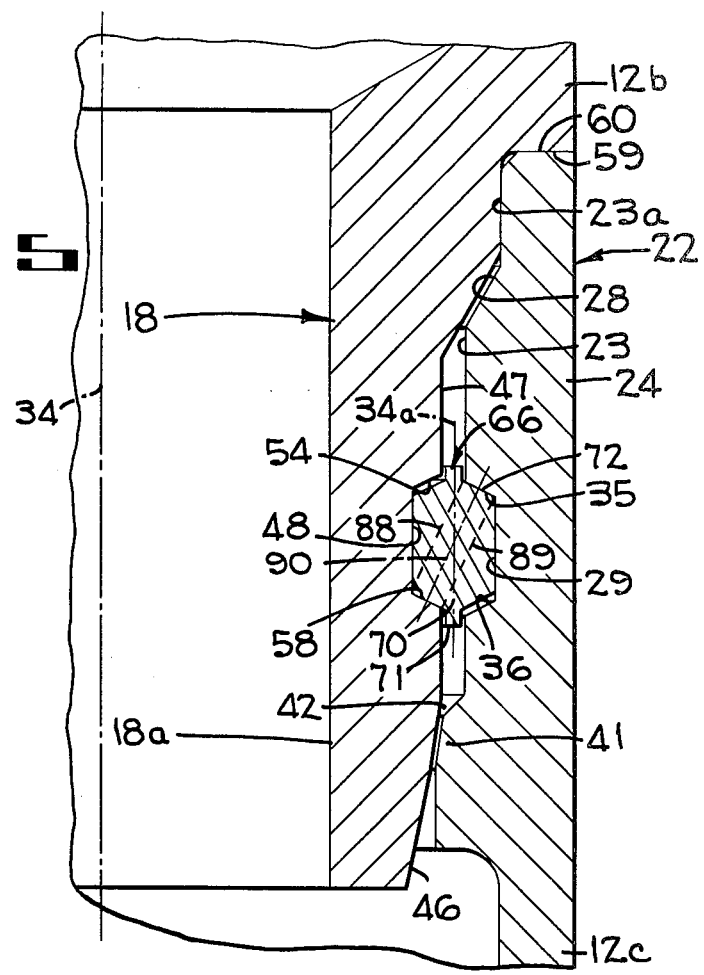
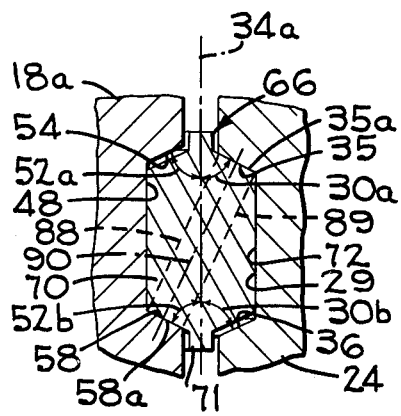
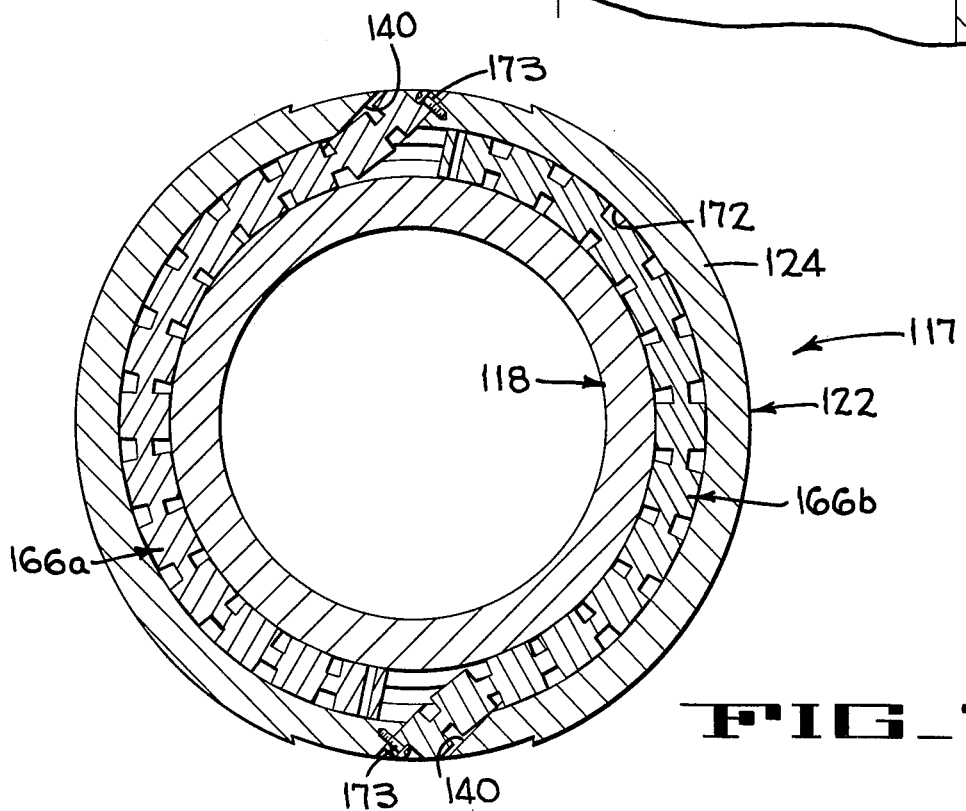

PILE CONNECTOR

BACKGROUND OF THE INVENTION

1. Field of the Invention

This invention relates to mechanical pipe connectors, and more particularly to connectors for interconnecting sections of large tubular piling

2. Description of the Prior Art

The production of oil and gas from offshore wells has grown into a major endeavor of the petroleum industry, and this growth has led to the development of means for drilling and completing wells, and for recovering petroleum products therefrom, in offshore locations where it is desirable to locate drilling and production platforms or wharfs. These platforms may be anchored to the sea floor by mechanical tubular piles driven into the sea floor and connected to the platform. Each of the piles may be from a few feet to over a thousand feet in length, depending upon the depth of the water at the offshore location. The handling of the large tubular piling is made considerably easier by building up the piles from several 100–150 foot long sections joined together in an end-to-end manner. A connector which adjoins two adjacent sections must be rugged, reliable, and easy to assemble and disassemble.

Prior art connectors most commonly used for this purpose include the interrupted screw thread variety. The interrupted screw thread connector has several limitations: (1) it is expensive to machine; (2) it requires great care in handling to prevent damaging the threads; (3) precision alignment is required during connection and disconnection; and (4) the pipe must be rotated to complete the assembly which requires that a large amount of torque be applied. The fact that the pipe must be rotated to complete the assembly is by far the greatest shortcoming of this prior art connector, and huge mechanical contrivances weighing many tons have been designed and built just to accomplish this rotation in an offshore environment. As the pile diameters approach 60 or more inches this rotation becomes almost impossible to accomplish because of the high torque required to rotate one section of pile while connecting or disconnecting it to an adjacent section.

Another type of prior art pile connector which has been tested for offshore use employs a snap-type locking ring for securing the two portions of the connector together. This connector has experienced failures because improper loading of the locking ring results in a high stress concentration in the machined receptacles into which the ring is positioned. The locking ring also has a tendency to vibrate into an unlocked position caused by vibrations as the pile sections are driven into the seafloor Other prior art drivable pile connectors use radially engageable dogs to secure one section of piling to the next section. The engageable dog type connector preloads the connection to secure the piling sections together; however, the vibrations which develop during offshore driving of piles may cause the connector to vibrate loose thereby relieving its preload. This vibration can cause radially movable threaded screws which are used in these connectors to seize and gall, thereby preventing the screws from being rotated after the driving operation. Also, the dogs tend to become brittle and are subject to bending or breaking because of small imperfections machined in the connectors used with the dogs. Because such dogs must be moved in a radial direction to disengage one section of piling from another, an excessive amount of space must be provided in the connectors for them.

During the stabbing operation of the connector halves it is undesirable that the halves fit tightly together during early portion of the stabbing stroke. Close engagement should be limited to the final few inches of travel as the halves are engaged.

In order to function satisfactorily, a pile connector must have sufficient strength to withstand the repetitive high tension and compressive stresses experienced under actual driving conditions. However, it has been shown that small amounts of "slack" in the pile connector do not contribute adversely to a loss of pile strength or to the loss of driving energy, and in some cases this slack contributes to the reduction of tension loads on the connector that are due to the reflection of the compression wave from the pile tips, and thus a rigid pile connector is not necessarily required for piling.

SUMMARY OF THE INVENTION

The present invention overcomes the foregoing problems and disadvantages by providing a simple and inexpensive pile connector that is easy to assemble, that does not require precise alignment between the two adjacent pile sections prior to their connection, and does not need to be rotated in order to connect one section of piling to another section. The connector includes a tubular inner member having a wall with a first groove cut in its outside face, and a tubular outside member having a wall with a second groove cut in its inside face. The outer member includes a hole extending through its wall and communicating with the second groove. The outer member also includes a passage to receive the inner member in a position with the first and second grooves juxtaposed to form a common annular channel between the inner and outer members. A flexible locking tape is insertable through the hole in the outer member and into the annular channel, with the tape having a shape to fill the channel, to lock the inner and the outer members together, and to partially fill an annular space which is provided between the inner and outer members to facilitate stabbing the inner member into the outer member.

BRIEF DESCRIPTION OF THE DRAWINGS

FIG. 1 is a diagrammatic view of an offshore jacket, and of a derrick barge for installing piling between the jacket and the sea floor, employing pile connectors of the present invention.

FIG. 2 is an enlarged perspective view of the pile connector, shown partly in section.

FIG. 3 is a horizontal section of one embodiment of the present invention showing the inner and the outer members of the pile connector connected together.

FIG. 4 is a perspective view of the flexible tape used to connect the inner and the outer members.

FIG. 5 is an enlarged vertical section of the connector of the present invention.

FIG. 6 is an enlarged fragmentary section of the connector of FIG. 5.

FIG. 7 is a horizontal section of a second embodiment of the pile connector of the present invention showing the inner and the outer members connected together.

DESCRIPTION OF THE PREFERRED EMBODIMENT

An offshore platform system employing a pile connector according to the present invention is diagrammatically represented in FIG. 1. This system comprises an offshore drilling and production jacket 10 having a plurality of pile guide sleeves 11 (only two being shown) spaced about the edge of the jacket 10, with a pile 12 having one end driven into the seafloor S and the other end of the pile guided through one of the guide sleeves 11 to anchor the jacket securely to the sea floor. Each of the other piles would be similarly connected, with the pile 12 usually slanted at an angle or batter away from the jacket 10 as shown in FIG. 1 to increase the stability of the jacket. A derrick barge B floating adjacent the jacket 10 supports a derrick D having a pickup elevator or other connecting means E which holds a section of piling 12a for insertion into one of the guide sleeves 11. When a section of piling is to be inserted into a guide sleeve 11, an aligning tower 16 is rotated upward about an axis A by a hydraulic ram R into a position parallel to an axis G of the guide sleeve. The aligning tower serves to guide the piling section 12a into alignment with the guide sleeve 11 and with an adjacent section of piling which is already in the guide sleeve 11, so the lower end of the piling section 12a can be connected to the upper end of the piling section in the guide sleeve. When the joint is completed, the aligning tower 16 is retracted into the position shown in FIG. 1 and the pile string is lowered to the mud line of the sea floor. Once the pile string has met resistance on the sea floor, a hammer is positioned on the pile string and the string driven into the floor to the desired depth, with additional pile sections being added until the piling is in final position.

One embodiment of a pile connector 17 of the present invention (FIGS. 2-6) includes a tubular inner member 18 which is welded or otherwise connected to an end of a pile section 12b (FIG. 5), and a tubular outer member 22 which is welded or otherwise connected to an end of an adjacent pile section 12c. The outer member 22 is annular in shape and has a central axial cylindrical passage or bore 23 into which the inner member 18 can be inserted. A wall 24 of the outer member includes an enlarged bore 23a at the upper end (FIGS. 2, 5) and a sloping cam surface 28 to facilitate guiding the lower end of the inner member into the bore 23. An annular groove 29 in the inside face of the wall 24 includes an upper face 35 inclined to form an obtuse angle 30a (FIG. 6) with a center line or axis 34 (FIG. 5) of the outer member 22. An axial line 34a (FIGS. 5, 6), drawn parallel to the axis 34, has been added to facilitate illustrating the position of the angle 30a. Another obtuse angle 30b (FIG. 6) is included between a lower face 36 of the groove and the axial line 34a. A plurality of holes 40 (FIGS. 2, 3) extends through the wall 24 between the groove 29 and the outside of the outer member 22. The member 22 further includes a radially inwardly extending lower flange 41 (FIG. 5) having a sloping cam surface 42 at the upper portion thereof to facilitate guiding the lower end of the inner member 18 into the passage 23.

The inner member 18 includes a lower end portion 18a (FIG. 5) having a reduced radial dimension, and a sloping cam surface 46 to facilitate guiding the inner member 18 into the passage 23 of the outer member 22. Approximately midway along the lower portion 18a in an outer wall 47 is an annular groove 48 juxtaposed the groove 29 in the outer member to form a common annular channel between the inner member 18 and the outer member 22. The groove 48 includes an obtuse angle 52a (FIG. 6) between the axial line 34a and an upper face 54 of the groove 48, and another obtuse angle 52b between the axial line 34a and a lower face 58 of the groove 48. A shoulder 59 on inner member 18 rests on the upper end 60 of the outer member 22 to transmit a downward force on the pile section 12c when the pile section 12b is driven in a downward direction. A pair of lugs 64a, 64b (FIGS. 2, 3) on the outer wall of the inner member 18 fit into a pair of mating slots 65a, 65b in the inner wall of the outer member 22 to prevent rotation of one member relative to the other and to guide a flexible locking tape 66 as it is pushed into position inside the grooves 29 and 48, and to guide the tape 66 as it is pushed out of the grooves.

The locking tape 66 (FIGS. 3, 4) includes a plurality of spaced enlargements 70 interconnected by an elongated central web 71 formed from a metallic ring such as steel. The central web 71 flexes to facilitate inserting a length of tape 66a into an annular channel 72a between a pair of holes 40 (FIG. 3) and another length of tape 66b into another annular channel 72b between another pair of holes 40. The web 71 fits between the outer wall 47 of the member 18 and the wall 24 of the passage 23 to aid in positioning the tape in the channels 72a, 72b (FIGS. 5, 6). The tape 66a is retained in the channel 72a by a screw 73 (FIG. 3) inserted through a hole 75 in the web 71 of the tape and mounted in a threaded hole 76a in the outer member 22. The tape 66b would also be retained in the channel 72b by a similar screw through the web of the tape 66b into a threaded hole 76b. The tapes 66a, 66b are further secured in the channels 72a, 72b by a pair of arcuate cover plates 80 (FIG. 3) which fit into a pair of dovetailed grooves 81 on the outer surface of the member 22. The cover plates are each secured over the holes 40 by a screw 82 extending through a hole 86 in the cover plate and secured in a threaded bore 87 in the sidewall 24. A tape removal tool (not shown) can be inserted into a hole 77 near the end portion of each of the tapes to facilitate removing tapes from the annular channel 72a, 72b.

The cross sectional shape of the tape (FIGS. 5, 6) is generally the same as the shape of the channel 72 formed by the grooves 29, 48, and is a generally elongated hexagon with obtuse angles between the axial line 34a and the sides 35, 36, 54, 58. This results in a compression of the material in a relative wide area generally positioned between a pair of boundary lines 88, 89 (FIGS. 5, 6). If the angles 30a, 30b, 52a, 52b were right angles, the result would be a high value of shear stress along the line 34a when an upward force is applied to the member 18 relative to the member 22. The aforementioned right angles would also cause a rotational moment to be applied to the locking tape. This shear stress and applied moment could cause the connector to fail and allow the piles 12b, 12c to separate.

The locking tape 66 can be made in other shapes if the upper face 35a (FIGS. 5, 6) is formed at right angles to a centerline 90, between the boundary lines 88, 89, and if the lower face 58a is also at right angles to the centerline 90 as shown in the embodiment of FIG. 6.

Another embodiment of the pile connector 117, disclosed in FIG. 7, includes an inner member 118, without the lugs 64a, 64b shown in FIG. 3, and an outer member 122 without the slots 65a, 65b of the connector shown in FIGS. 2 and 3. In this embodiment, it is not necessary to rotationally orient the inner member 118 relative to the outer member 122. The outer member 122 includes a pair of holes 140 between the annular channel 172 and the outside of the wall 124. A pair of flexible locking tapes 166a, 166b are inserted into the channel 172 through the holes 140 and are removable through the same holes. The tapes are retained in the channel 172 by the same type of screws 173 and cover plate (not shown) as in the embodiment of FIGS. 2 and 3.

The pile connector of the present invention provides an apparatus for quickly and easily connecting adjacent sections of piling using a flexible locking tape having an elongated hexagon cross-shape to lock an inner connector member to an outer member. The unique shape of the tape reduces the shear loading and rotational moment on the tape and reduces the chance of failure of the connector.

Although the best mode contemplated for carrying out the present invention has been herein shown and described, it will be apparent that modification and variation may be made without departing from what is regarded to be the subject matter of the invention.

What is claimed is:

1. A mechanical pipe connector comprising:
   a tubular inner member having a wall with a first groove cut in an outside face thereof;
   a tubular outer member having a wall with a second groove cut in an inside face thereof and at least one hole extending through said outer member wall and communicating with said second groove, said outer member also having a passage to receive said inner element with said first and said second grooves juxtaposed to form a common annular channel between said inner and said outer members;
   a flexible locking tape insertable through said hole into said annular channel, said tape having a shape to fill said channel and lock said inner and said outer members together, said tape and said annular channel each having a polygon cross-sectional shape with internal obtuse angles to minimize the stress concentration on said tape and on the walls of said channel as a separating force is applied between said inner and said outer members; and
   a tape web extending axially from said tape and positioned between said outside face of said inner member and said inside face of said outer member to aid in positioning said tape in said common annular channel.

2. A pipe connector as defined in claim 1 wherein said locking tape and said annular channel each have a hexagonal cross-sectional shape to minimize the stress concentration on said locking tape as a separating force is applied between said inner and said outer members.

3. A pipe connector as defined in claim 1 wherein said locking tape includes a plurality of segments interconnected by a plurality of webs to form an elongated flexible tape, each of said segments having a cross-sectional shape which substantially fills said channel.

4. A pipe connector as defined in claim 1 including means for retaining said tape in said channel.

5. A pipe connector as defined in claim 1 wherein said tape includes a plurality of segments inserted into said annular channel.

6. A connector for joining two pieces of pipe comprising:
   a tubular inner member having a wall with a first groove cut in an outside face thereof;
   a tubular outer member having a wall with a second groove cut in an inside face thereof and having a passage to receive a portion of said inner element with said inner and said outer members axially aligned and with said first and second grooves juxtaposed to form a common annular channel between said inner and said outer members;
   said inner and said outer members having abutting faces to limit the engagement of said inner and said outer members,
   at least one access hole extending through one of said walls in said inner and said outer members into said channel with said hole generally tangential to a portion of said channel; and
   a locking tape insertable through said hole into said channel to subtantially fill said channel and prevent separation of said inner and said outer members, said locking tape having two parallel faces, said faces being positioned such that a line drawn from the center of one face to the center of the other face makes a right angle with both of said faces, wherein said locking tape includes a web portion extending between said outside face of said wall of said inner member and said inside face of said wall of said outer member to aid in positioning said tape in said common annular channel.

7. A connector as defined in claim 6 wherein said locking tape includes a plurality of enlarged portions which are movable into said channel between said inner and said outer members.

8. A connector as defined in claim 6 wherein said locking tape includes a plurality of spaced enlargements connected by an elongated web to form a length of flexible tape.

9. A connector as defined in claim 6 wherein a force urging said inner member in an axial direction out of said passage of said outer member to separate said inner and said outer members is less than a compressive force along said center line urging said parallel faces together.

10. A connector for joining two pieces of pipe comprising:
   a tubular inner member having a wall with a first groove cut in an outside face thereof;
   a tubular outer member having a wall with a second groove cut in an inside face thereof and having a passage to receive a portion of said inner member with said inner and said outer members axially aligned with said first and second grooves juxtaposed to form a common annular channel between said inner and said outer members, said members being axially engageable with said wall on said inner member and said wall on said outer member forming a common annular space when the connector is engaged and providing a loose fit between said inner and said outer members during a substantial portion of the stroke required for axial engagement;
   a generally tangential passage in one of said inner and outer members extending through one of said walls in said inner and said outer members into one of said grooves;
   a locking tape insertable through said tangential passage to substantially fill said channel, said tape having a web portion extending axially into said common annular space between said walls to fill a portion of said annular space and prevent rotational movement of said locking tape when a separating force is applied between said inner and said outer members to prevent separation of said inner and said outer members.

* * * * *